(12) United States Patent
Mobley et al.

(10) Patent No.: US 7,117,996 B1
(45) Date of Patent: Oct. 10, 2006

(54) ADJUSTABLE OBJECT SIZE GRADER

(75) Inventors: John Mobley, Bend, OR (US); David K. Johnsen, Redmond, OR (US); Scott Benjamin, Nyssa, OR (US)

(73) Assignee: Key Technology Inc., Walla Walla, WA (US)

( * ) Notice: Subject to any disclaimer, the term of this patent is extended or adjusted under 35 U.S.C. 154(b) by 71 days.

(21) Appl. No.: 10/425,592

(22) Filed: Apr. 29, 2003

(51) Int. Cl.
*B07B 13/075* (2006.01)

(52) U.S. Cl. ............ 209/668; 209/671; 209/672; 209/673; 209/674; 209/667

(58) Field of Classification Search ........... 209/546, 209/660, 662, 667, 668, 673, 674
See application file for complete search history.

(56) References Cited

U.S. PATENT DOCUMENTS

| | | | | |
|---|---|---|---|---|
| 4,266,676 A * | 5/1981 | Ruckstuhl et al. | ......... | 209/672 |
| 4,405,050 A * | 9/1983 | Fenton et al. | ............ | 209/668 |
| 5,109,988 A * | 5/1992 | Artiano | ............ | 209/673 |
| 5,279,427 A * | 1/1994 | Mobley | ............ | 209/668 |
| 5,558,234 A * | 9/1996 | Mobley | ............ | 209/671 |
| 5,998,754 A * | 12/1999 | Pervieux | ............ | 209/587 |
| 6,053,330 A * | 4/2000 | Lavoie | ............ | 209/668 |
| 6,257,414 B1 * | 7/2001 | Gerhardt et al. | ............ | 209/667 |
| 6,305,553 B1 * | 10/2001 | Tirschler | ............ | 209/668 |
| 6,382,426 B1 * | 5/2002 | Nicholson | ............ | 209/618 |
| 6,834,764 B1 * | 12/2004 | Kreft et al. | ............ | 209/673 |

* cited by examiner

*Primary Examiner*—Joseph Rodriguez
*Assistant Examiner*—Jonathan R Miller
(74) *Attorney, Agent, or Firm*—Northwest Patent Law

(57) ABSTRACT

An adjustable apparatus for sizing objects, mainly delicate foods, by the rotation of a set of at least 7 rollers, each roller having one less tooth so that the rollers move at progressively higher revolutions per minute, from the in-feed shear roller of 144 revolutions per minute to the discharge roller of 210 revolutions per minute. The rollers are shaped and finished by 7 to 12 flats, alternated with a crown in between each flat, cut the horizontal length of the roller. The rollers are then sandblasted over the entire circumference of the surface to a depth range of 280 to 300 micro-inches.

17 Claims, 8 Drawing Sheets

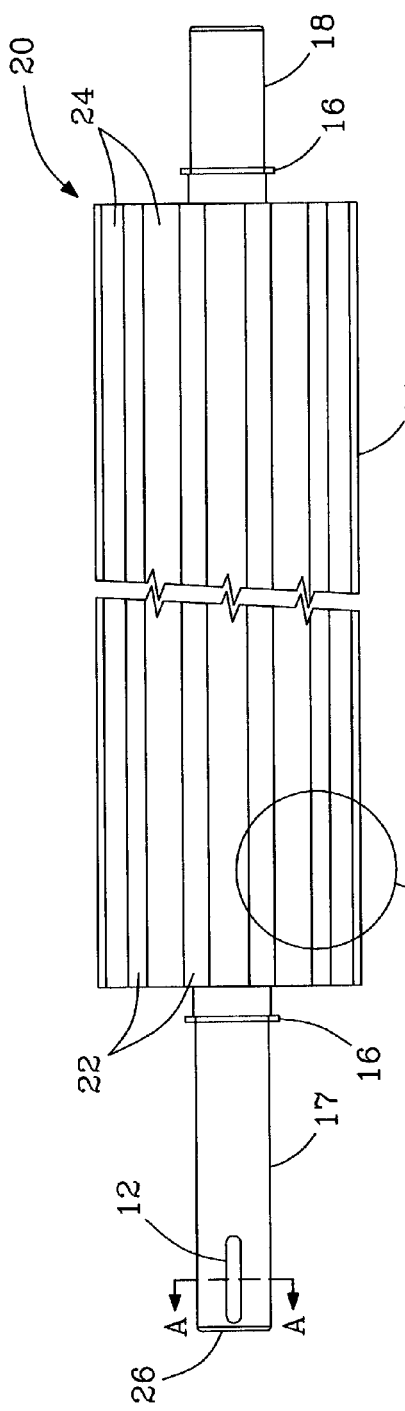
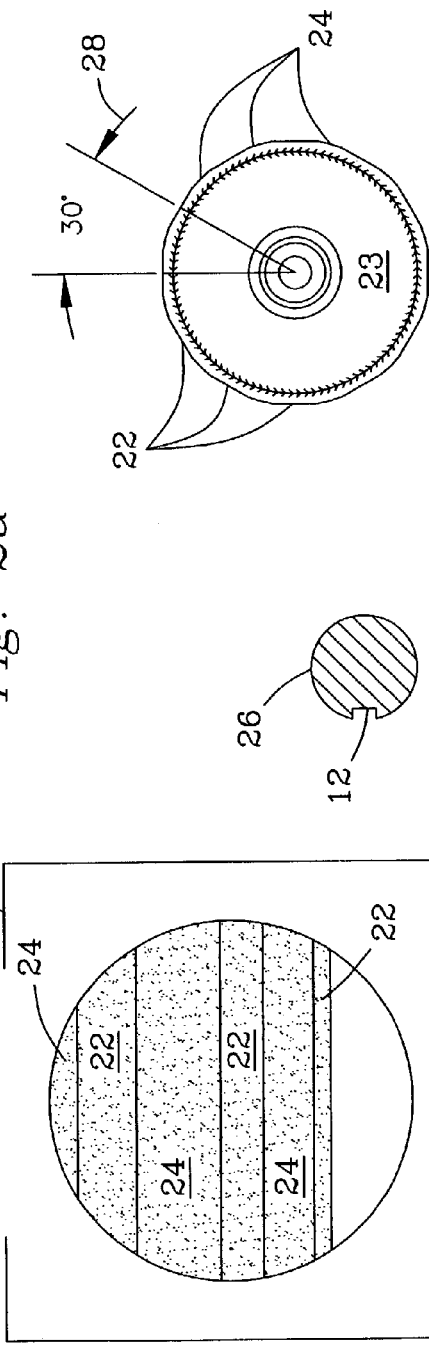
Fig. 2a
Fig. 2b
Fig. 2c
Fig. 2d

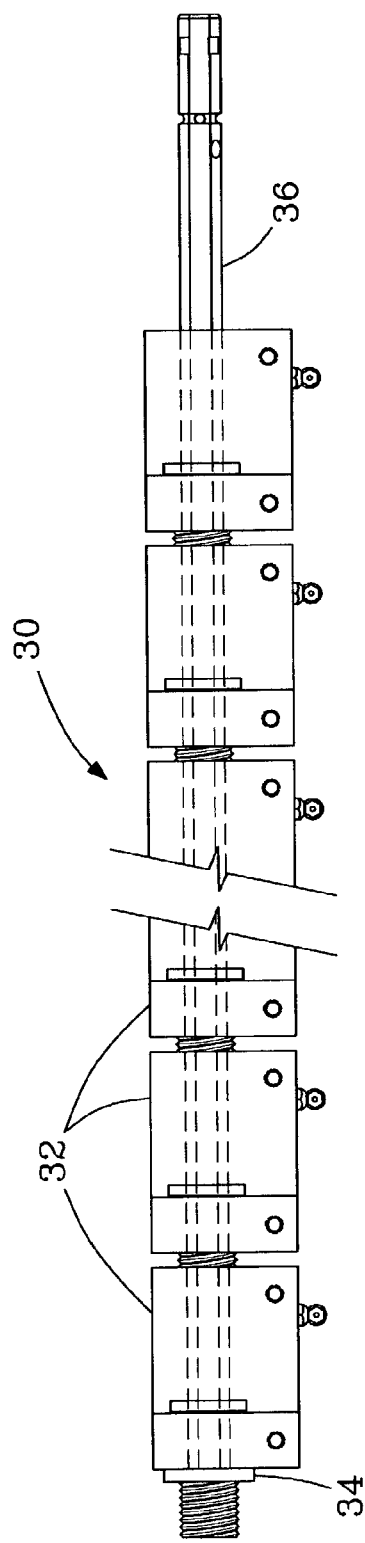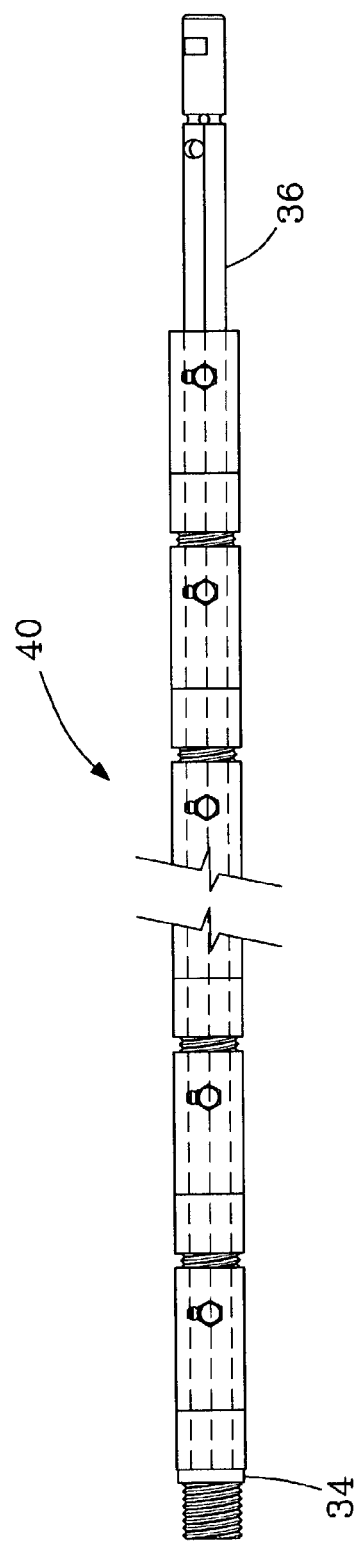
Fig. 3a
Fig. 3b

ADJUSTABLE OBJECT SIZE GRADER

BACKGROUND OF THE INVENTION

1. Field of the Invention

The present invention relates to a mechanical object size grader and specifically to a food grader for delicate foods.

2. Description of Related Art

The human population of the world has been in a continual state of growth during recent centuries. This growth has produced a substantial demand for the mass production of high-quality foods. In order to meet these pressing demands food processing equipment and machinery has been developed. Specialized machinery has been developed to size or sort damage-sensitive food products based on diameter.

It was discovered that rollers 14 with smooth surfaces would not move objects 86 across the rollers 14 for grading, regardless of the number or depth of the flats 22. When the flats 22 are cut, the areas in between the flats 22 are left in the original rounded shape and denoted as crowns 24. Crowns 24, the rounded portions of the roller 14, must exist to allow objects to float on the surface of the roller 14. In 1994, a roller bed for separating fines and slivers was designed to process foods, in particular French-fried potatoes, having fines and slivers in U.S. Pat. No. 5,279,427 (hereinafter U.S. Pat. No. '427). In U.S. Pat. No. '427, the flat portions 2 of the rollers did not have a roughened surface; the crown portions 4 of the rollers 14 had a roughened surface. As shown in FIG. 1, the surface of the roller 10 was first sandblasted and second was cut into 6 flats 2 parallel to the length of the roller 14. Therefore, the roller is made with the flats 2 having a smooth surface and the crowns 4 having a roughened surface.

In U.S. Pat. No. '427 the rollers operated at the same speed and had six flats and crowns that allowed a camming action to facilitate the falling of potato slivers in between the rollers. However, the camming action of the food processor in U.S. Pat. No. '427 caused damage to delicate foods such as green beans.

The rollers in U.S. Pat. No. '427 were constructed by starting with a 4-inch schedule 40-gauge stainless steel pipe 10 (FIG. 1). The pipe had several horizontal cuts or flats 2 made continuously over the length of the pipe. In U.S. Pat. No. '427, 6 flats 2 were cut to a depth of 0.90 inches with a 60-degree angle 8 between the flats leaving crowns 4 (FIG. 1).

To cause less damage to foods and other objects, the rollers need less of the camming action of U.S. Pat. No. '427. Camming can be reduced in direct proportion to increasing the number of flats 2 and decreasing the depth of the individual flats.

Another facet of the food sorting industry was machinery for sorting beans. A bean grader was designed having a grader drum with fixed grader bars, which extended between two angular end plates in U.S. Pat. No. 5,322,103 (hereinafter U.S. Pat. No. '103). The bean grader had a complex design and was difficult to manufacture and to maintain.

A product size food grading system was designed with a progressive speed system using thin plastic disks and flexible rubber pockets connected to rotary shafts in U.S. Pat. No. 5,558,234 (hereinafter U.S. Pat. No. '234). The food grading system in U.S. Pat. No. '234 was designed to eliminate the need for a vibratory sizer, reduce noise, occupy less floor space, waste less properly-sized product. The system in U.S. Pat. No. '234 is a different class of food processing equipment.

The present invention is an adjustable object size grader that grades objects based on diameter and will grade foods with at least 10 to 15 percent less product damage than any other related art; the adjustable object size grader is easy to maintain. Grading foods with less damage and ease of maintenance result in remarkable savings to the user.

SUMMARY OF THE INVENTION

The present invention is an adjustable object size grader with 2–10 rotatable rollers. The rollers are designed by cutting at least 7 flats leaving at least 7 crowns for the entire length of the rollers in an alternating uniform pattern. The depths of the cuts are from 0.015 inches to 0.30 inches. The rollers are then sandblasted to produce a roughened surface in the range of 280 to 300 micro-inches in depth over the entire circumference and length of each roller. The rollers rotate in a direction that will move objects from the in-feed shear roller to the discharge shear roller. Beginning with the in-feed shear roller and ending with the discharge shear roller each roller has a sprocket with one less tooth; the decrease in sprocket teeth number causes each successive roller to rotate at higher revolutions per minute (RPM) than the prior roller.

The apparatus for sizing objects is adjustable; the gap or pocket width between the above-described rollers is uniformly controllable by visually setting an indicator, with a handle. This adjustment control is mechanically produced. At the end of each roller is a shaft assembly; the idle side and the driver side are each stabilized with sealed bearings each supported with an adjustable block assembly. Threaded through the adjustable block assemblies is an idle side hex shaft and a drive side hex shaft. The hex shafts are perpendicular to the rollers. The respective hex shafts connect to an idle side worm gear and a drive side worm gear; the respective worm gears are meshed to respective worms that are rotatable with an adjustable shaft assembly that is perpendicular to the hex shaft ends. The adjustable shaft assembly has a handle. One of the 10 idle side adjustable block assemblies has an indicator that protrudes through a slit in the idle side vertical housing. Below the indicator on the idle side vertical housing are graduations of measurements in approximately ⅛ of an inch increments etched into the idle side vertical housing for indicating the gap distance between the at least ten adjustable rollers. And below the graduations of measurements are Arabic numerals etched into the idle side vertical housing. Turning the handle the distance of one graduation of measurement by visual inspection of the indicator adjusts the gap between the rollers by about 1/64 of an inch.

BRIEF DESCRIPTION OF THE DRAWINGS

FIG. 2a is a front view of the roller and shaft assembly.

FIG. 2b is an enlarged view of the sandblasted surface of the roller.

FIG. 2c is an end view along line A—A of the shaft assembly drive side of FIG. 2a.

FIG. 2d is an end view of the roller and shaft assembly.

FIG. 3a is a top view of the adjustable block assemblies and hex shaft.

FIG. 3b is a side view of the adjustable block assemblies and hex shaft.

DETAILED DESCRIPTION OF THE INVENTION

Figure 8:
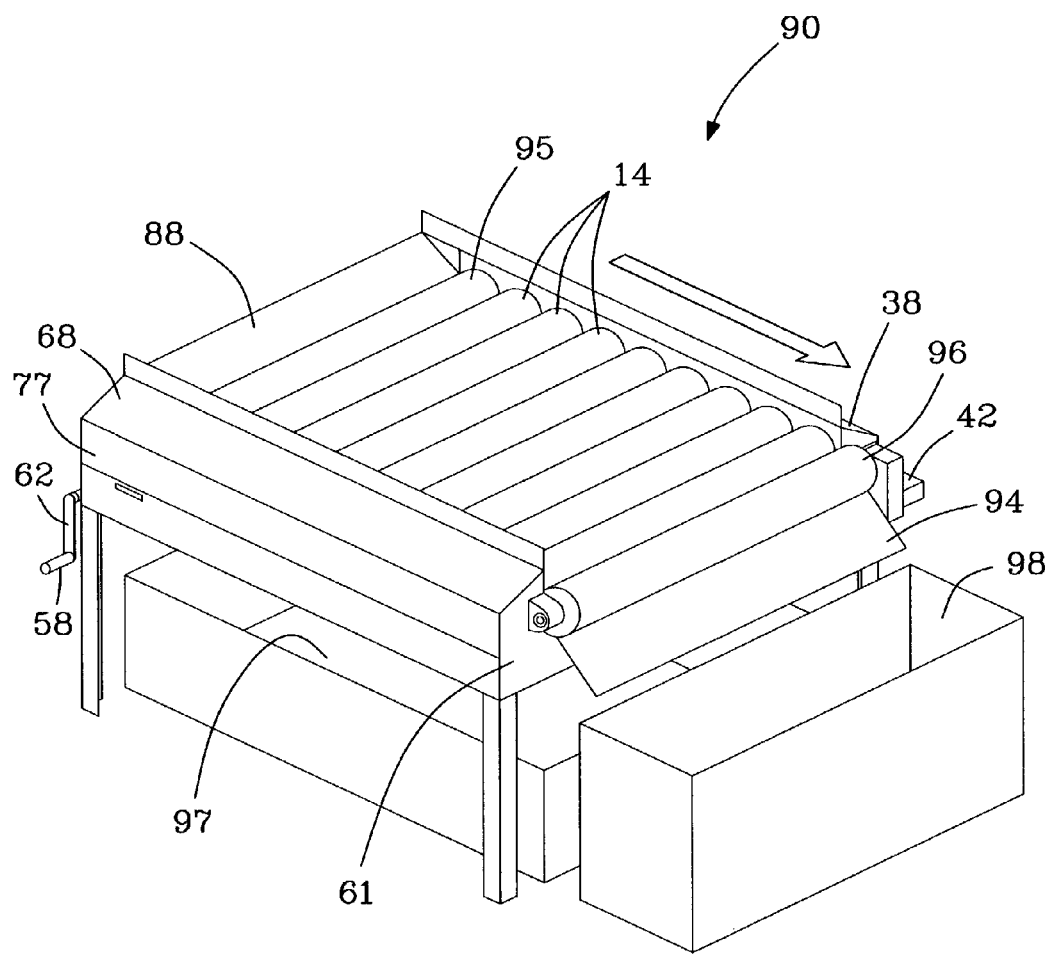
FIG. 8 is a downward perspective from above the assembled adjustable object size grader complete with an in-feed shear and a discharge shear.

FIG. 8 represents a fully assembled adjustable object size grader 90. The fully assembled adjustable object size grader 90 can be considered a two-way diameter split size grading system. The basic components of the size grader 90 are an in-feed shear 88, a set of rollers 14, and a discharge shear 94. The objects to be graded are presented at the in-feed shear 88. A portion of the objects that have at least the critical diameter size are lifted and floated across the rotating rollers 14 to the discharge shear 94 where the objects are cleared from the discharge shear roller 96. The preferred embodiment of the present invention has 10 rollers 14 but any number of rollers 14 above two can be used.

As represented in FIG. 2a and FIG. 2d, the optimal camming to reduce damage to green beans is provided by using a 4-inch schedule 40 gauge stainless steel pipe or roller 14 with 12 flats 22 cut in a horizontal direction extending the entire length of the roller 14 having an angle of 30 degrees 28 between the flats 22 with a depth of 0.10 to 0.80 inches for each flat. The crowns 24 help lift larger material up and out of the pocket or gap 81 between the rollers while allowing undersized objects to drop into the gap 81 (FIG. 6) between the rollers 14. Although 4-inch schedule 40-gauge stainless steel pipe is used to construct the rollers 14 in this invention, any durable material could be used such as ceramics, plastics, and a multitude of other metals.

The preferred embodiment requires that each flat 22 be cut at the same depth leaving a crown 24 between each flat 22 for an alternating pattern of flats 22 and crowns 24. One skilled in the art may recognize that the combinations and permutations of the number of flats 22 ranging from 7 to 12 and the depths of the flats 22 0.10 inches to 0.80 inches are almost limitless. The flats 22 could be cut in a series of progressive depths starting at 0.015 inches up to 0.80 inches or may be cut in any depth pattern, for example, one flat 22 of 0.015 inches next to a second flat 22 of 0.30 inches next to a third flat 22 of 0.015 inches.

The rollers 14 are cut shaped by first cutting the flats 22 and subsequently sandblasting the entire roller 14 so that both the 7 to 12 flats 22 and the 7 to 12 crowns 24 are sandblasted (FIG. 2b). In order to perform the sandblasting, a mixture of 50%, 20 grit silica sand is mixed with 50%, 70 grit silica sand. The mixture is applied at 80 psi. The sandblaster's static pressure is held at 100 psi. A number 4-spray nozzle is held 18 inches from the roller surface 14 at approximately a 90-degree angle. The mixture is applied with a 20% interwoven pattern and the entire stainless steal pipe is sandblasted to obtain a uniform surface roughness of approximately 280 to 300 micro-inches.

A wide variety of methods may be employed to roughen the surface of the rollers 14, including, but not limited to, grinding, sanding, pitting, abrading, or any combination of these techniques. Also, a prepared strip having a fabricated surface may be adhered to the surface of the rollers 14 to produce the same effect.

The roller assembly 20 consists of a hollow roller 14 with two end plates 23 welded or attached to each of the two ends of the roller 14. Extending from the center of the end plates 23, as an axis of rotation, is an idle side shaft assembly 18 with a slinger 16 and a drive side shaft assembly 17 with a slinger 16 and a shaft key aperture 12 (FIGS. 2a and 2c) used to hold sprockets 82 (FIG. 6) in place with sprocket keys 78.

Figure 1:
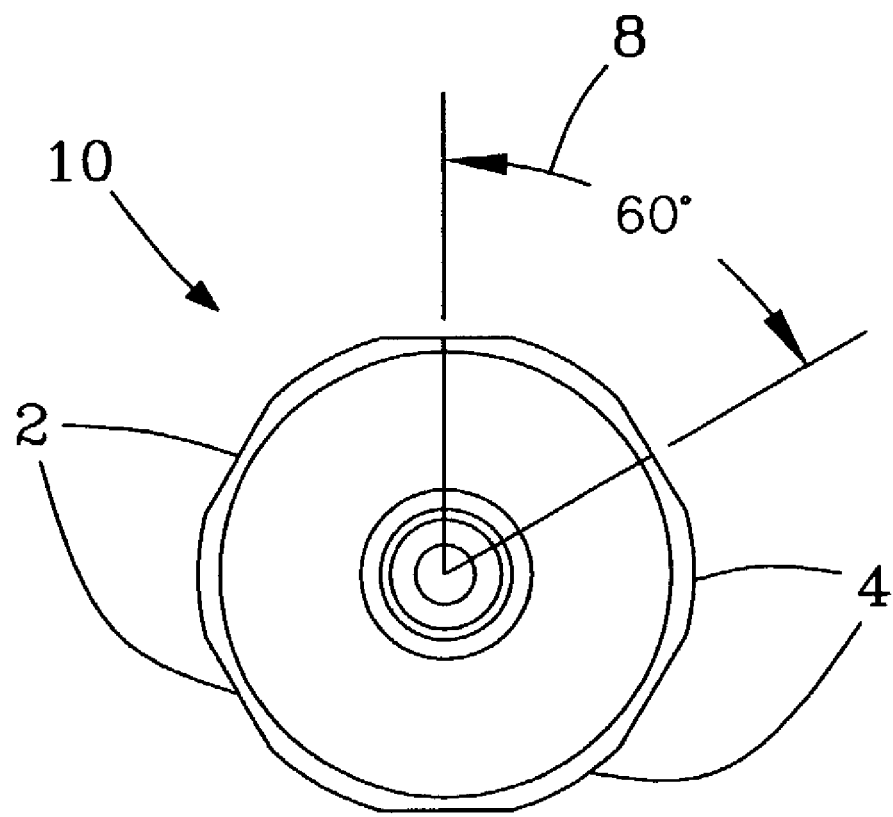
FIG. 1 is an end view of the prior art roller.
Figure 4:
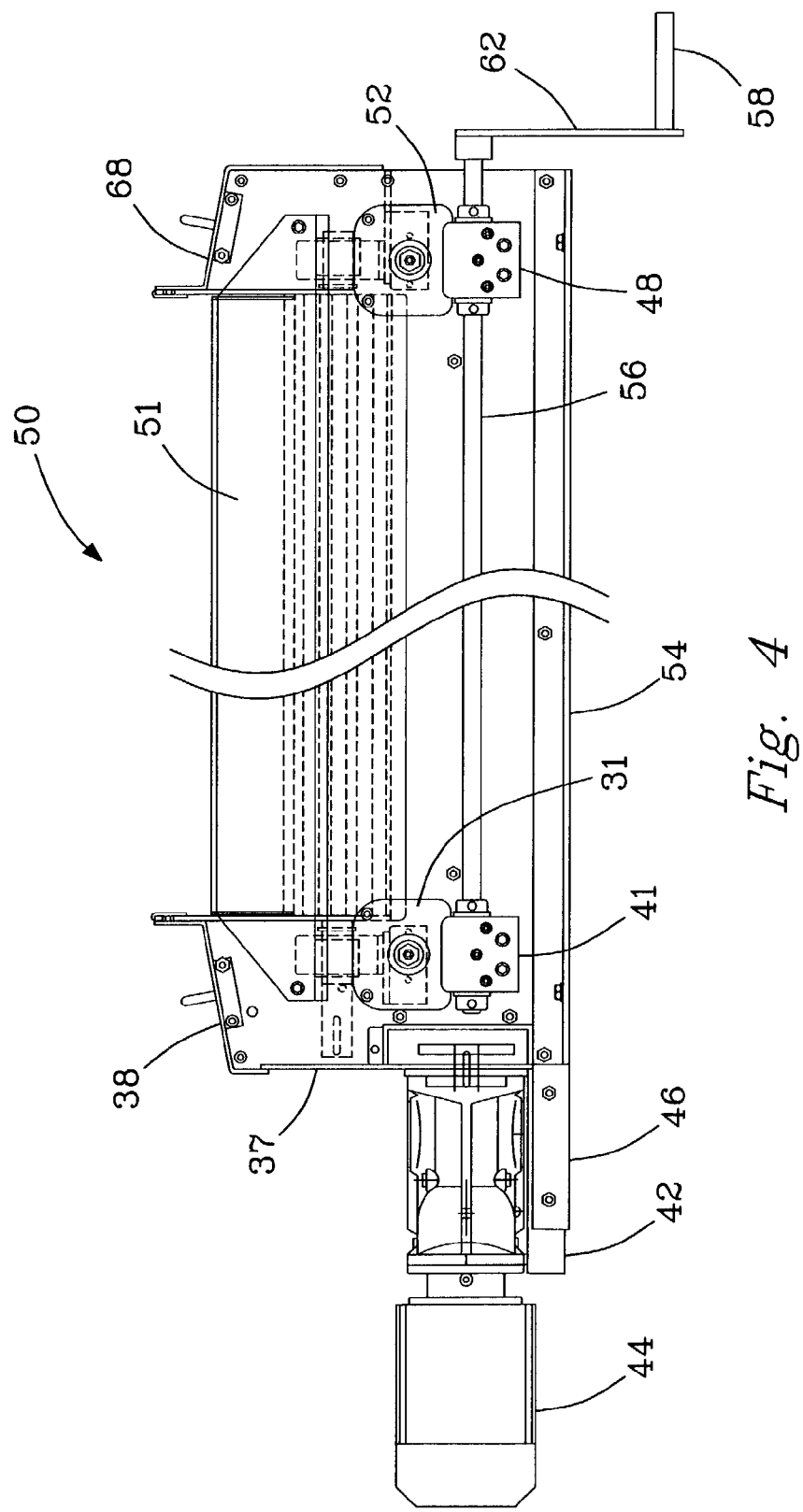
FIG. 4 is an end view of the in-feed shear of an assembled adjustable object size grader.

This roller assembly 20 construction allows the shaft assemblies to be held in place and smoothly rotate with a drive side sealed bearing (not shown) and an idle side sealed bearing 76. The sealed bearings are attached to adjustable block assemblies 32, which have a block spacer 34 at the end of the last adjustable block assembly 32 to provide a locator for the adjustable block assemblies 32 (FIG. 3a and FIG. 3b). The adjustable block assemblies 32 can be manually moved to adjust the gap 81 between the rollers 14 by simultaneously rotating: an idle side hex shaft 36 with an idle side worm gear (not shown) protected with an idle side worm gear cover 52 (FIG. 4); the idle side worm gear is meshed with an idle side worm (not shown) inside an idle side worm-retaining block 48 and a drive side hex shaft 36 with a drive side worm gear (not shown) protected with a drive side worm gear cover 31 (FIG. 4); the drive side worm gear (not shown) is meshed with a drive side worm (not shown) inside a drive side worm-retaining block 41, both the idle side worm and the drive side worm being simultaneously rotatable with an adjustable shaft assembly 56 attached to a handle subassembly 62, with a handle 58 for ease and precision of manipulation (FIG. 4). This manipulation adjusts the gap 81 size between the rollers 14.

Figure 5:
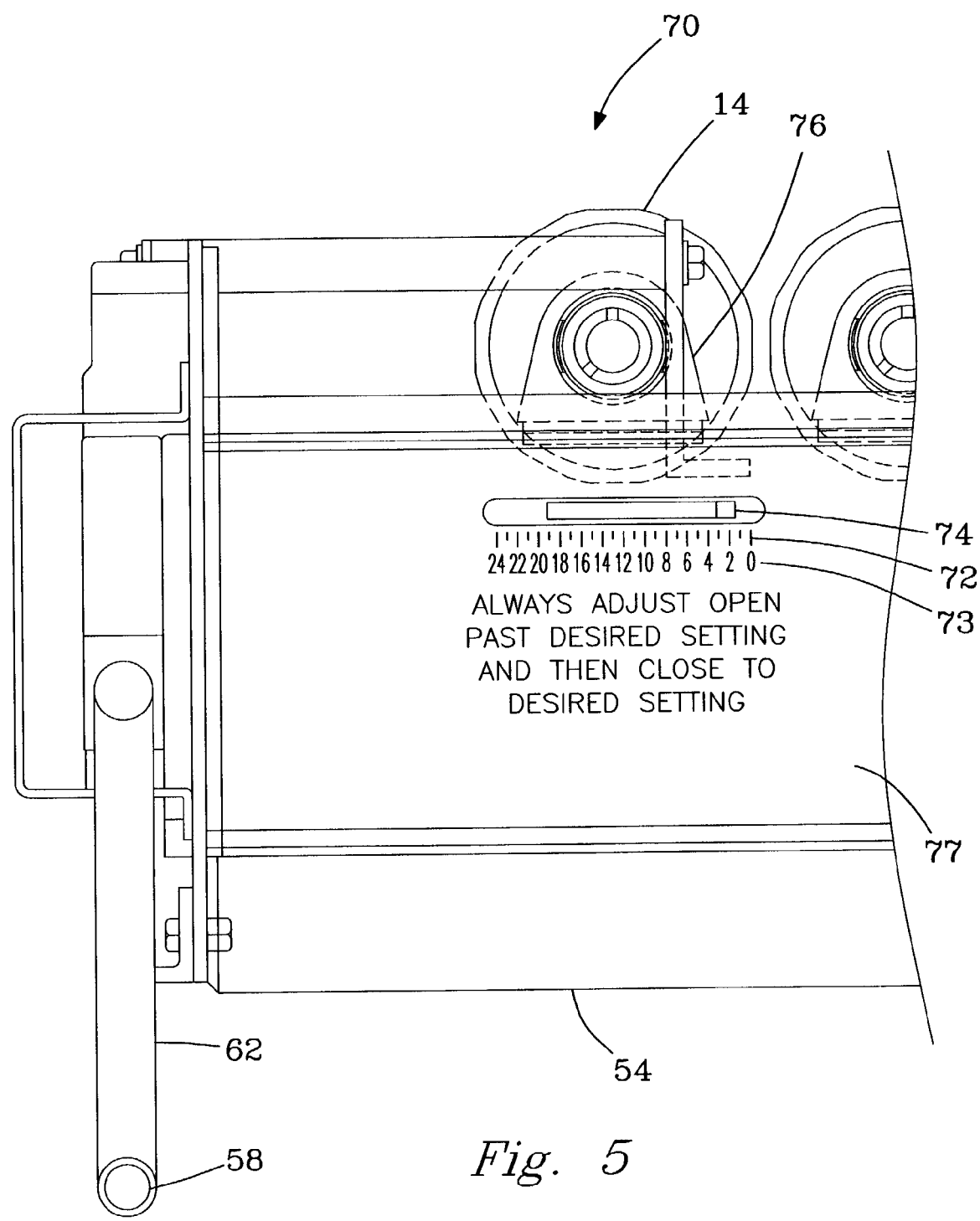
FIG. 5 is a side view of the adjustable object size grader showing the adjustment indicator.

The gap 81 is manually set between the rollers 14 by turning the handle 58 to the desired number 72 (FIG. 5). Even though the gap 81 size between the rollers is manually controlled, one skilled in the art will readily recognize that the manipulation of these adjustable shaft assemblies 30, 40 may be controlled by any motor, engine, or pressurized system capable of producing enough energy to move the adjustable shaft assemblies 32.

In FIG. 5, one block assembly 32 (FIG. 3a) on the idle side shaft assembly 18 has a bearing assembly indicator 74 that permits a universal standard of gap measurement between the rollers 14. Graduations of measurements 73 are marked with an Arabic numbering system 72 that is etched or stenciled to the idle side vertical housing 77. The graduations of measurements 73 are in approximately 1/8 of an inch increments to allow for about a 1/64 of an inch roller space adjustment.

In FIG. 4, the housing base 54 supports the idle side vertical housing 37, the drive side vertical housing 77, a rear-housing portion 51, an in-feed shear 88 and a front housing portion 61 with a discharge shear 94. All of these housing sides and fronts are welded or attached in a vertical direction for structural stability with an idle side top cover 38 and a drive side top cover 68 attached for further support.

The present indicator 74 is a thin piece of metal supported with another thin piece of metal attached to one of the adjustable shaft assemblies 30, 40. The indicator 74 protrudes through a slit in the idle side vertical housing 77. One skilled in the art could devise any number of indicators or mechanisms that could perform the same function. For example, a Linear Variable Differential Transformer (LVDT) may be used to provide a signal indicating the size of the gap by monitoring the location of an adjustable block assembly relative to a fixed point on the machine. In addition, an electric motor, which controls the size of the gap, could be monitored by other sensors indicating the size of the gap. In addition, electronic indicators may also permit automatic electronic gap settings to be made. Further, an optical or other type of sensor could be used to determine the size of the incoming objects to be graded and use that information to calibrate the gap size between the rollers. All of the manual adjustments of this machine could be automatically controlled with a computerized means through electric or optical systems.

An electric motor 44 (FIG. 4), supported with a motor support brace 42 that is attached to the drive side shaft assembly 17 (FIG. 2a) and held in place with a housing bracket 46 (FIG. 4), is powered to turn a drive mechanism or drive linkage or chain 99 (FIG. 7) that rotates the sprockets 82 (FIG. 6), which in turn rotates the rollers 14. One operable size for the electric motor 44 is one horsepower. An electric motor with a wide range of power could also be used. Also, each roller 14 could be driven by its own motor to achieve greater flexibility in the revolutions per minute speed progression of each individual roller 14.

Figure 6:
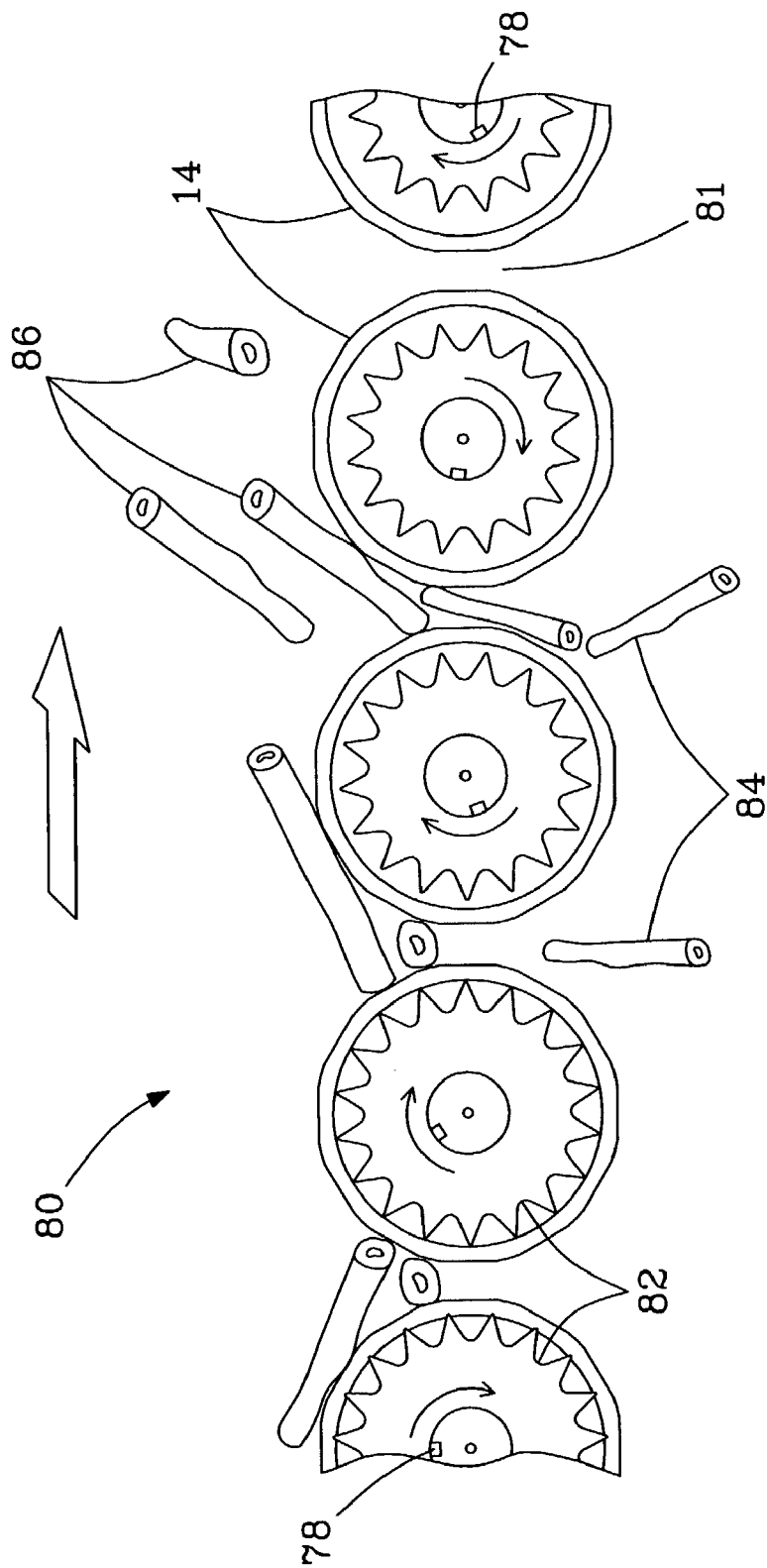
FIG. 6 is a view of the fungible items being size graded.

Each roller 14 turns at a progressively increased rotational velocity or RPM because each sprocket 82 on each roller 14 has one less tooth. The chain 99 moves at the same rate for all the sprockets 82. The fewer the number of teeth in a sprocket the greater the RPM of that sprocket relative to other sprockets with a greater number of teeth that will have a lower RPM. As can be seen in FIG. 6, each sprocket has one less tooth; the sprockets 82 cause the rollers 14 to rotate at progressively higher revolutions per minute (RPM). An example of the rates in roller speeds is 144 (RPM) for the in-feed roller 95 or first roller, 151 RPM for the second roller, 159 RPM for the third roller, 168 RPM for the fourth roller, 178 RPM for the fifth roller, 189 RPM for the sixth roller, 202 RPM for the seventh roller, 216 RPM for the eight roller, 233 RPM for the ninth roller, and 252 RPM for the shear roller 96 or tenth roller.

In FIG. 6, the objects to be graded are illustrated moving across the rollers 14 in a shear direction or direction perpendicular to the direction of the shaft assembly 26 (FIG. 2a) to the rollers 14 (FIG. 8). The rollers 14 having a sand-blasted surface 21 with a multitude of flats 22 and crowns 24 that lift the graded objects 86 with a diameter greater than the critical diameter up and forward with each roller 14, carrying the graded objects at a progressively faster RPM so that the objects above the critical diameter 86 are moved across all of the rollers from the in-feed shear 88 to the discharge shear 94 and to an area beyond the discharge shear 98. As the rollers 14 rotate completely at random, there is no specific rotational relationship or sequence between the rollers 14 (e.g. crown 24 to crown 24 or flats 22 to crowns 24). The objects with a diameter less than the critical diameter 84 fall through the gap 81 to a location below the apparatus 97.

In FIG. 6, the first sprocket 82 has 21 teeth that physically require the first sprocket 82 to have a larger diameter and the last sprocket 82 has 10 teeth that physically allows the sprocket 82 to have a smaller diameter. The number of teeth per roller 14 is as follows: in-feed shear roller 95, 21 teeth; second roller 14, 20 teeth; third roller 14, 19 teeth; fourth roller 14, 18 teeth; fifth roller 14, 17 teeth; sixth roller 14, 16 teeth; seventh roller 14, 15 teeth; eight roller 14, 14 teeth; ninth roller 14, 13 teeth; and discharge shear roller 96, 12 teeth. The sprockets 82 are held in place with a key 78 placed in a keyway 12 (FIG. 2c). The tops of the rollers 14 are all level in the vertical plane with each other. This is accomplished by constructing a support 101 (FIG. 7) for the driving chain 99 to have an angle that accommodates the changes in the sprocket 82 sizes; from the first sprocket 82, attached to the in-feed shear roller 95, the chain 99 angles upward to reach the last sprocket 82, attached to the discharge shear roller 96, but the tops of the sprockets are substantially level.

Figure 7:
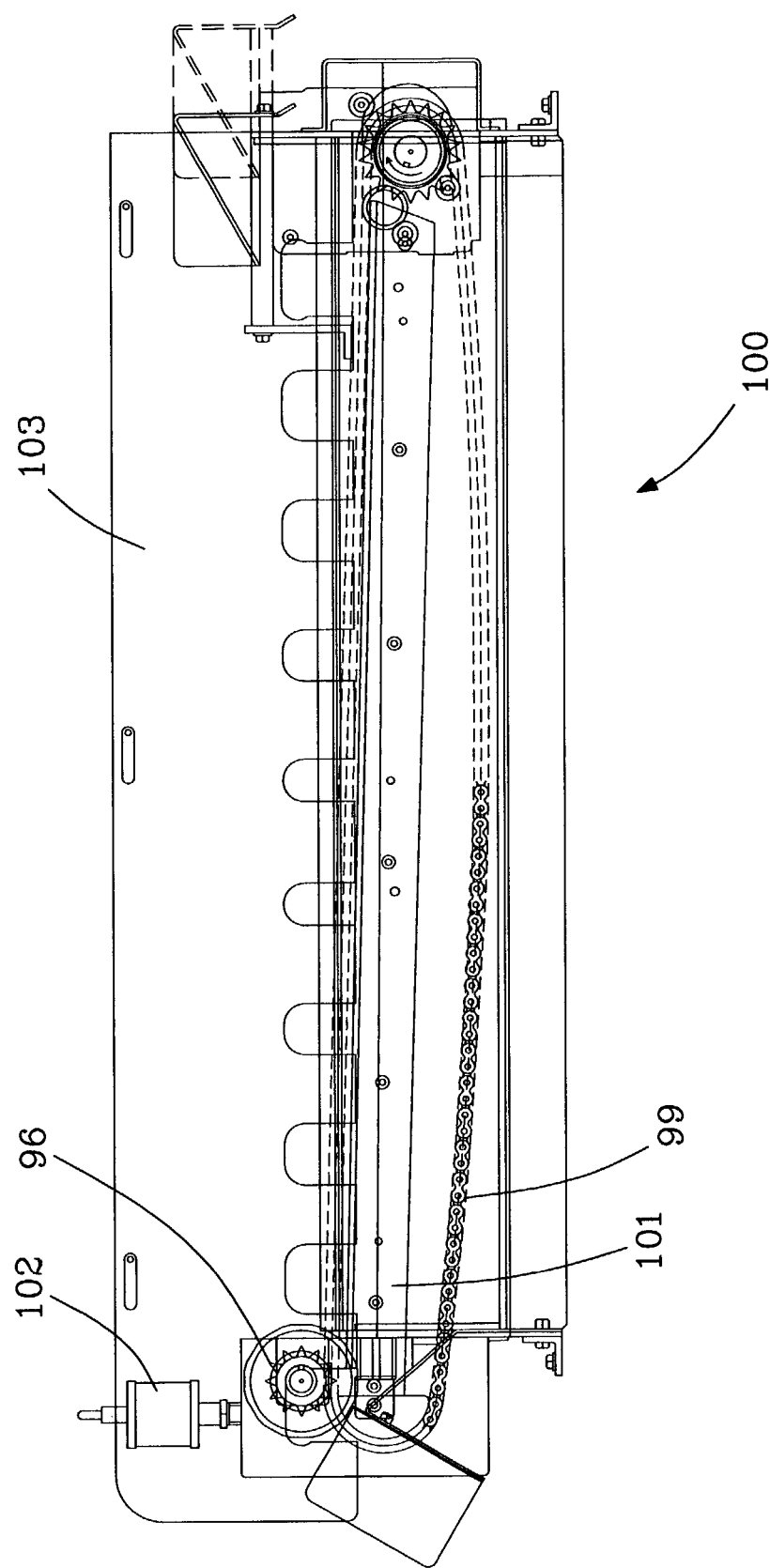
FIG. 7 is a drive side view of the adjustable object size grader without the sprockets or rollers attached.

FIG. 7 shows the chain 99 as it angles upward on the chain support 101 to the discharge shear roller 96. FIG. 7 represents an optional automatic lubrication device or oiler 102 and a removable side plate 103. The removable side plate 103 protects the sprockets 82 chain 99 from being contaminated with food and other debris. The side plate 103 is designed to accommodate the gap 81 adjustment between the rollers 14 (FIG. 6).

FIG. 8 represents the assembled, adjustable object size grader 90 with a housing. The idle side vertical housing 77 and the drive side vertical housing 39 are attached to the housing base 54 (FIG. 4). In FIG. 4, the housing base 54 supports the idle side vertical housing 37, the drive side vertical housing 77, a rear-housing portion 51, an in-feed shear 88 and a front housing portion 61 with a discharge shear 94. All of these housing sides and fronts are welded or attached in a vertical direction for structural stability with an idle side top cover 38 and a drive side top cover 68 attached for further support. FIG. 4 also shows that an idle side top cover 68 and a drive side top cover 38 are used to protect the sealed bearings 76 and other working parts from contamination resulting from food particles, dust, and other debris.

The food objects graded can be green beans, cranberries, cherries, peas, carrots, and peanuts. One additional feature of the adjustable object size grader 90 is the ease of maintenance when the power supply to the adjustable object size grader 90 has been turned off. The parts to the adjustable object size grader 90 come with standard fittings and are easily accessible and replaceable. An oiler 102 (FIG. 7) may be attached to facilitate lubrication. The adjustable object size grader 90 has a simple but thorough lubrication system (not shown), with idle side sealed bearings 76, and drive side sealed bearings (not shown).

It is to be understood that the above-described arrangements are only illustrative of the application of the principles of the present invention. Alternative arrangements may be devised by those skilled in the art without departing from the spirit and scope of the present invention. The appended claims are intended to cover such modifications and arrangements. Thus, while the present invention has been shown in the drawings and fully described above with particularity and detail in connection with what is presently deemed to be the most practical and preferred embodiment(s) of the invention, it will be apparent to those of ordinary skill in the art that numerous modifications, including, but not limited to: variations in size, materials, shape, and form; function and manner of operation; and assembly and use may be made without departing from the principles and concepts set forth herein.

We claim:

1. An apparatus for segregating objects having differing diameters in a product stream, comprising:
    an in-feed end configured to receive the product stream;
    a discharge end configured to release those objects having a diameter greater than a critical diameter; and
    an area below the apparatus configured to receive those objects having a diameter less than the critical diameter;
    a plurality of product rollers comprising a first product roller located near the in-feed end, a last product roller located near the discharge end, and a plurality of intermediate product rollers positioned between the first product roller and the last product roller, and wherein each product roller has an outer surface having a plurality of flat portions and alternating round crown portions formed therein, and wherein each of the product rollers are configured to rotate at a rotational velocity, and wherein the outer surface of each product roller that is textured so as to impart apply a lifting force that is greater than a force of gravity acting on objects the product stream with a diameter greater than the critical diameter so that the objects with the greater diameter are conveyed to adjacent product rollers until they reach the discharge end, and wherein the lifting force is less than the force of gravity acting on objects in the product stream with a diameter that is less than the critical diameter allowing the objects with a diameter that is less than the critical diameter to drop to the area below the apparatus;

and wherein the first product roller has a first rotational velocity, and wherein the last product roller has a last rotational velocity, and wherein the first rotational velocity is less than the last rotational velocity; and wherein the plurality of intermediate product rollers are each sequentially located at intervals between the first product roller and the last product roller to provide a sizing gap between each of the product rollers and wherein the plurality of product rollers further comprise at least five rollers, and wherein the plurality of flat portions comprise at least eight flats, and the plurality of crowns comprise at least eight crowns, and wherein the plurality of flats and crowns are uniformly spaced in an alternating longitudinal pattern throughout the periphery of each product roller.

2. The apparatus according to claim 1, wherein each of the plurality of flats are formed to a depth of less than 0.10 inches.

3. The apparatus according to claim 2, wherein the outer surface of each of the plurality of rollers has an average sandblasted depth, and wherein the average sandblasted depth has a value between 280 micro-inches to 300 micro-inches.

4. The apparatus according to claim 2, and wherein each of the plurality of product rollers are fabricated using a non-corrosive material.

5. The apparatus according to claim 2, and wherein each of the plurality of product rollers are fabricated using a material selected from a group consisting of stainless steel, plastic, and ceramic.

6. The apparatus according to claim 1, and wherein the objects have a shape, and wherein the shape of the objects is substantially cylindrical.

7. The apparatus according to claim 1, and wherein the objects have a shape, and wherein the shape of the objects is substantially spherical.

8. An adjustable sizing apparatus for segregating objects according to their size, comprising:
 a housing base;
 an infeed shear borne by the housing base;
 a discharge shear borne by the housing base;
 a plurality of rollers rotatably borne by the housing base, and each positioned at regular intervals between the infeed shear and the discharge shear, and wherein each roller has an idle shaft end, and an opposite drive shaft end, and an outer roller surface defined between the idle shaft end and the drive shaft end, and wherein the outer roller surface has a length, and comprises a plurality of flat areas formed longitudinally along the length of the outer roller surface, and a plurality of crown areas formed longitudinally along the length of the outer roller surface, and further wherein a gap distance is defined as a minimum distance between the outer roller surface of two rollers that are adjacently positioned;
 a plurality of sprockets fastened proximate to the drive shaft end of each roller, and wherein each sprocket has a unique and predetermined number of teeth, and wherein the sprocket fastened to the roller proximate to the infeed shear has a first value equal to the number of teeth on the sprocket, and wherein the sprocket fastened to the roller proximate to the discharge shear has a second value equal to the number of teeth on the sprocket, and wherein the first value is greater than the second value;
 a chain drive assembly borne by the housing base, comprising a motor, motor drive sprocket, and a link chain, and wherein the link chain is coupled to each sprocket in force transmission relation so that a force is transmitted to each roller to impart a rotational velocity, and wherein the roller proximate to infeed shear has a first rotational velocity, and wherein the roller proximate to the discharge shear has a second rotational velocity, and wherein the first rotational velocity is less than the second rotational velocity;
 and wherein the objects to be segregated are transported through contact with a portion of the outer roller surface of the plurality of rollers, and wherein objects that have a size that is greater than the gap distance are urged to travel in a direction toward the roller proximate to the discharge shear, and wherein objects that have a size that is less than or equal to the gap distance are prone to fall between the outer surfaces of adjacent rollers.

9. The adjustable sizing apparatus according to claim 8, further comprising an adjustment mechanism configured to set the gap distance, and wherein the adjustment mechanism comprises a plurality of block assemblies, a pair of adjustment shafts having a hex portion and a worm gear portion, and a rotation mechanism; and wherein each of the block assemblies are threadingly borne by the adjustment shafts, and wherein the plurality of rollers are borne by the plurality of block assemblies, and wherein the rotation mechanism is coupled in force transmission relation to each of the adjustment shafts and wherein the plurality of rollers comprise at least five rollers, and wherein the plurality of longitudinal flat areas comprise at least eight flat longitudinal areas, and further wherein the plurality of longitudinal crown areas comprise at least eight longitudinal crown areas.

10. The adjustable sizing apparatus according to claim 9, and wherein the outer roller surface of the roller has a sandblasted texture with an average depth of between 280 to 300 micro-inches.

11. The adjustable sizing apparatus according to claim 10, and wherein the outer roller surface is sandblasted with a mixture of 50% of 20 grit silica sand and 50% of 70 grit silica sand in an interwoven pattern.

12. The adjustable sizing apparatus according to claim 9, and wherein the gap distance has a value, and wherein the gap distance is less than 0.76 inches and greater than 0.06 inches.

13. The adjustable sizing apparatus according to claim 9, and wherein the rotational velocity of each of the plurality of rollers has a direction that is the same direction for the rotational velocity of each of the plurality of rollers.

14. The adjustable sizing apparatus according to claim 9, and wherein the number of teeth of each sprocket is equal to a term in an arithmetic progression beginning with the last value and extending to the first value, and wherein the terms of the arithmetic progression are equal to the number of teeth of each sprocket and begin at the sprocket fastened to the roller proximate to the discharge shear and progress to each sprocket fastened to each of the plurality of rollers and extend to the sprocket fastened to the roller proximate to the infeed shear.

15. The adjustable sizing apparatus according to claim 8, and wherein the first value is less than twenty-two.

16. The adjustable sizing apparatus according to claim 15, and wherein each of the plurality of rollers further comprise a shaft which extends from the drive shaft end, and through the center of each roller, and extends to the idle shaft end.

17. The adjustable sizing apparatus according to claim 16, and wherein the shaft further comprises a first slinger located proximate to the idle shaft end, and a second slinger located proximate to the drive shaft end, and a key aperture formed therein that is configured to accept a key to fasten the sprocket to the shaft proximate to the drive shaft end of each roller.

* * * * *